Sept. 24, 1968 R. E. PHILLIPS 3,402,534
FORAGE CROP HARVESTER
Filed June 28, 1965
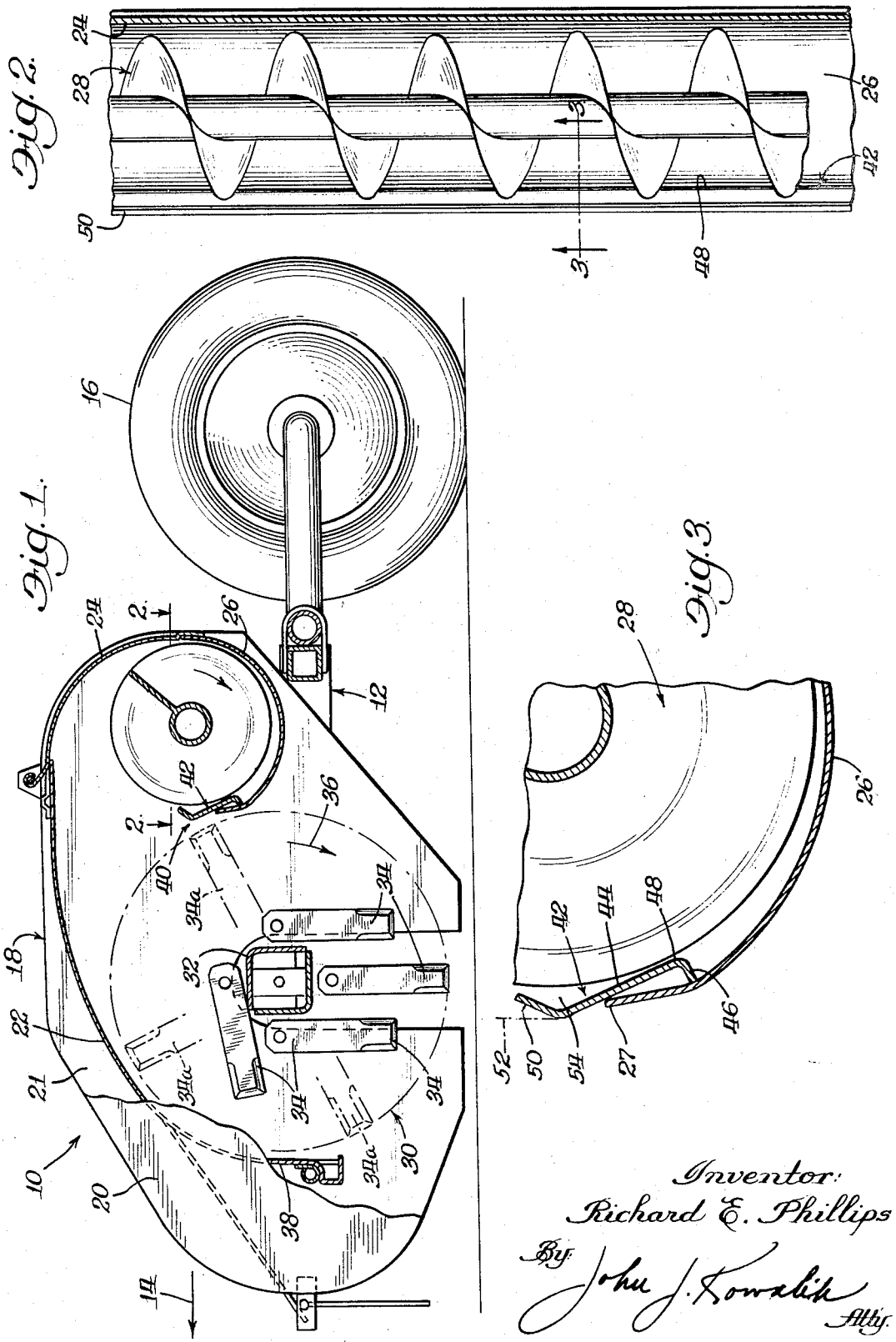
Inventor:
Richard E. Phillips
By John J. Kowalik
Atty.

3,402,534
FORAGE CROP HARVESTER
Richard E. Phillips, Storrs, Conn., assignor to International Harvester Company, Chicago, Ill., a corporation of Delaware
Filed June 28, 1965, Ser. No. 467,379
8 Claims. (Cl. 56—24)

ABSTRACT OF THE DISCLOSURE

A chopper-auger conveyor combination within a housing defining a transfer area therebetween, a stripper in the transfer area for facilitating delivery of the crops from the chopper to the conveyor having an upper edge portion inclined upwardly and rearwardly from the chopper to the auger and having a lower stripper portion beneath the upper leading edge of the auger trough and intersecting the auger.

---

The present invention relates to a forage crop harvester.

The type of harvester to which the present invention is adapted includes a chopper having chopping knives arranged in sets along an axis and rotated about that axis, the knives cutting into the plants on the ground and throwing them into a conveyor such as an auger which then conveys the cut plants or stalks transversely and delivers them into a blower or similar means for delivering them into a conveyance such as a wagon.

In such harvester difficulties have arisen at the point of transfer from the chopper to the auger. At this point the plants tend to accumulate and clog, and means heretofore used for the purpose of positively stripping the plants from the chopping knives and aiding their transfer to the auger would, at least in certain cases, itself cause objectionable jamming and clogging.

A broad object therefore of the present invention is to provide novel means at the point of transfer between such chopper and auger for stripping the plants from the chopper and assisting their transfer to the auger.

A more specific object is to provide such means in the form of a stripper which prevents the plants from being carried downwardly by the chopper but which is so constructed and shaped as to assist the action of the auger in keeping the stripper clear of clogging.

Other objects and advantages of the invention will appear from the following detailed decription taken in conjunction with the accompanying drawing wherein:

FIGURE 1 is a vertical fore-and-aft sectional view of a forage crop harvester embodying the features of the present invention;

FIGURE 2 is a view taken at line 2—2 of FIGURE 1; and

FIGURE 3 is a large scale view taken at line 3—3 of FIGURE 2.

Referring now in detail to the drawing, the forage crop harvester incorporating the features of the present invention is shown in its entirety at 10 and includes suitable frame means indicated as a whole at 12 by which it is drawn by a tractor in the direction indicated by the arrow 14, the harvester having suitable wheels 16. The harvester includes a housing 18 having end walls 20 and 21, a fragment of the near one 20 being shown, and a top element 22. The housing in itself is of known type and the top element continues upwardly and rearwardly, and in return downwardly as indicated at 24. Secured to or formed as an extension of the rear portion 24 is an auger trough 26 having a forward, upwardly directed terminal extension 27. An auger 28 of known kind is mounted in the trough in a known manner, and both extend transversely through the machine between the end walls 20 and 21. These members will be referred to again hereinbelow.

Forwardly of the auger 28 is a chopper 30 which includes a transverse shaft 32 suitably mounted for rotation in the frame. Secured to the shaft 32 are a plurality of sets of chopping knives or flails 34, each set in the present instance including four and the sets being spaced along the shaft substantially throughout the length thereof. These chopping knives are of known type and are so shaped and spaced along the shaft as to effectively cover the entire ground space traversed by the machine, and cut all of the plants in that space.

The chopping knives 34 are pivotally mounted at one end on the shaft and their other ends are free to swing out to a direction closely approximating radial, due to centrifugal force, as indicated at 34a. This form of chopper is also known. The chopper 30 is rotated in such direction that the chopping knives at the lower part thereof move forwardly as indicated by the arrow 36.

The top element 22 of the housing extends downwardly at its forward end as indicated at 38 forming a hood or shield over the forward and upper portion of the chopper, this element terminating near or slightly below the axis of the chopper.

In operation, the chopper knives 34 cut the plants and carry them upwardly in the housing, the top element 22 at its forward and upper portion confining the plants, the plants then being flung by the knives rearwardly, many of them directly into the auger 28 but some of them also tending to be carried downwardly by the knives into the space between the chopper and the auger here indicated at 40 and also designated a transfer point or area.

The present invention includes a combination crop deflector and auger stripper 42 at the transfer point 40 which assists in transferring the plants from the chopping knives to the auger. This crop deflector and auger stripper, which may also be designated a crop guiding means, is in the form of a transverse plate and is shown in detail in large scale in FIGURE 3. It includes a central element 44, a bottom element 46 bent out of the plane of the element 44, to substantially perpendicular relation thereto, forming a knee 48, and a top element 50 also bent out of the plane of the central element 44 but in the opposite direction, and at a different angle, this angle being obtuse. The specific shape and position of this upper element will be referred to again hereinbelow.

The stripper plate 42 is secured to the auger trough 26 and extends the full length of the latter between the end walls 20, 21. The bottom element 46 may be welded to the inner surface of the terminal extension 27 of the trough, and the central element 44 welded to the front upper extremity thereof. As seen best in FIGURE 3, the knee 48 of the stripper plate is closely adjacent the periphery of the auger. From this point upwardly the main central element 44 is inclined away from the auger and the top element 50 then extends back toward the auger but is spaced from the periphery thereof a distance greater than is the knee 48. The top element 50 is closely adjacent a tangent to the auger, and in this case slightly inwardly of such tangent. The top element 50 is preferably disposed approximately 20° from the vertical indicated by the line 52, and located mainly above the axis of the auger, although it may extend a short distance therebelow. The inclination of the element 50 from the vertical, i.e., its horizontal component of direction, and its location above the axis of the auger, assist the auger in clearing the stripper plate, or lifting the plants therefrom. It will be understood that the above examples of shape and location of the element 50 are not to be considered limiting, but that considerable variation therefrom may be made with satisfactory results. Variations may be made to accommodate, for example, kind of plants to be harvested, the condition thereof, speed of operation, as well as other factors.

As the chopper knives carry certain of the plants downwardly at the transfer point 40, as referred to above, those plants engage the stripper plate and a large portion of them are removed from the chopper knives. Heretofore in the use of stripper plates there was a decided tendency to "hairpinning" in which the plants would be doubled over the top edge of such stripper plate, and jamming and clogging of the plants was a serious matter and the auger was not particularly effective for clearing such jammed and clogged plants. In the present case due to the direction of the upper element 50 in the stripper plate i.e. close to tangency with the auger, the edge of the auger at the upper edge of the element 50 moves in a direction closely proximate that of the element 50 and readily removes the plants or stalks that tend to become jammed or clogged.

The flights of the auger produce a transverse wiping action on the stripper plate as well as a tangential lifting action. The transverse wiping action of the auger has particular effect on the knee 48, preventing the plants or stalks from extending downwardly therebeyond and tending to push them up into the space 54 below the upper element 50. This positions the plants or stalks in such a way that they are more readily and easily lifted off of the top element 50 by the generally upward peripheral movement of the auger at that point.

While I have herein disclosed a preferred embodiment of the invention it will be understood that changes may be made therein within the scope of the appended claims.

I claim:

1. A harvester comprising a frame adapted for movement along the ground, a chopper having a plurality of blades rotating around a horizontal transverse axis, a conveyor having an auger operating within a trough rearwardly of the chopper adapted to receive plants from the chopper and to convey them transversely from the housing, said trough having a leading edge adjacent the chopper, the chopper and the conveyor defining therebetween a transfer area above the leading edge of the trough, and stripper means in said transfer area having a transversely extending plate with an upper portion defining a generally upwardly extending edge portion, the upper portion being inclined away from the chopper toward the conveyor and being located closely adjacent the leading edge of the trough.

2. The invention according to claim 1 and said upper portion being located principally above the axis of the auger.

3. The invention set out in claim 1 wherein the upper portion of the stripper plate is in the neighborhood of 20° from the vertical and closely adjacent a plane tangent to the auger.

4. The invention according to claim 1 and said stripper plate comprising a lower stripper portion directed toward the auger and underposed with respect thereto for wiping crop material tending to adhere thereto, said auger rotating in a direction advancing toward said stripper portion and receding from the upper portion.

5. The invention according to claim 1 and a lower portion of the plate disposed in a plane intersecting the auger, and a generally flat portion between said upper and lower portions extending generally tangentially of the auger and providing a relief area between the auger and upper portion.

6. A harvester including a frame and a housing, a chopper in the housing including a plurality of blades rotatable around a horizontal transverse axis and adapted on rotation thereof for cutting plants and delivering them generally rearwardly, a conveyor rearwardly of the chopper and extending transversely of the housing parallel with the chopper and including a trough with an upper leading edge and an auger within the trough, the chopper and conveyor defining a transfer area therebetween above said edge, and stripper means in said transfer area including a transverse plate having an upper portion forming a generally upwardly directed edge extending generally toward the auger and lying in a direction closely approximating the direction of the movement of the auger at that edge and having a lower knee portion between the trough and said auger closely adjacent to the periphery thereof 7. A harvester comprising a chopper and a conveyor comprising an auger within a trough to the rear thereof, the chopper and auger rotating on transverse horizontal axes, the trough having an upper leading edge below the top of the auger, the chopper and conveyor defining a transfer area therebetween above said leading edge and being operative for cutting plants and delivering them rearwardly to the auger, and stripper means between the chopper and auger including a transverse plate having lower and upper portions closely proximate the auger respectively above and below said leading edge and a central portion directed forwardly from the lower portion to the upper portion and projecting forwardly of the leading edge.

8. The invention set out in claim 7 wherein said lower portion extends from the central portion away from the auger the upper portion extends from the central portion toward the auger.

References Cited

UNITED STATES PATENTS

| | | | |
|---|---|---|---|
| 3,159,958 | 12/1964 | Mathews | 56—24 |
| 3,300,032 | 1/1967 | Dion | 198—213 |
| 3,337,026 | 8/1967 | Silver et al. | 198—64 |

ABRAHAM G. STONE, *Primary Examiner.*

P. A. RAZZANO, *Assistant Examiner.*